United States Patent
Nicolas et al.

(10) Patent No.: US 11,040,884 B2
(45) Date of Patent: Jun. 22, 2021

(54) PROCESS FOR CONTINUOUSLY SYNTHESIZING ZEOLITE CRYSTALS

(71) Applicant: Arkema France, Colombes (FR)

(72) Inventors: Serge Nicolas, Lons (FR); Cécile Lutz, Gan (FR); Jean-Luc Dubois, Millery (FR); Yvan Lecomte, Arthez de Béarn (FR)

(73) Assignee: Arkema France, Colombes (FR)

( * ) Notice: Subject to any disclaimer, the term of this patent is extended or adjusted under 35 U.S.C. 154(b) by 83 days.

(21) Appl. No.: 16/493,172

(22) PCT Filed: Mar. 12, 2018

(86) PCT No.: PCT/FR2018/050568
§ 371 (c)(1),
(2) Date: Sep. 11, 2019

(87) PCT Pub. No.: WO2018/167414
PCT Pub. Date: Sep. 20, 2018

(65) Prior Publication Data
US 2020/0010330 A1    Jan. 9, 2020

(30) Foreign Application Priority Data

Mar. 17, 2017 (FR) .................................... 1752196

(51) Int. Cl.
| | |
|---|---|
| C01B 39/02 | (2006.01) |
| C01B 39/46 | (2006.01) |
| C01B 39/14 | (2006.01) |
| C01B 39/22 | (2006.01) |
| C01B 39/26 | (2006.01) |
| C01B 39/38 | (2006.01) |
| C01B 39/20 | (2006.01) |
| C01B 39/30 | (2006.01) |

(52) U.S. Cl.
CPC ............ *C01B 39/023* (2013.01); *C01B 39/02* (2013.01); *C01B 39/14* (2013.01); *C01B 39/20* (2013.01); *C01B 39/22* (2013.01); *C01B 39/26* (2013.01); *C01B 39/30* (2013.01); *C01B 39/38* (2013.01); *C01B 39/46* (2013.01)

(58) Field of Classification Search
CPC ......... C01B 39/02; C01B 39/14; C01B 39/20; C01B 39/22; C01B 39/26; C01B 39/30; C01B 39/38; C01B 39/46
See application file for complete search history.

(56) References Cited

U.S. PATENT DOCUMENTS

| | | | |
|---|---|---|---|
| 4,314,979 A | 2/1982 | Deabriges | |
| 4,661,334 A | 4/1987 | Latourrette et al. | |
| 4,848,509 A | 7/1989 | Bruhnke et al. | |
| 6,146,613 A | 11/2000 | Anglerot et al. | |
| 6,656,447 B1 | 12/2003 | Tannous et al. | |
| 6,773,694 B1 | 8/2004 | Lesch et al. | |
| 10,850,988 B2 * | 12/2020 | Nicolas ................. | B01J 29/082 |
| 2009/0304890 A1 | 12/2009 | Ni et al. | |

FOREIGN PATENT DOCUMENTS

| | | |
|---|---|---|
| BE | 869156 A | 1/1979 |
| EP | 0149929 A1 | 7/1985 |
| FR | 1357762 A | 4/1964 |
| FR | 2398698 A1 | 2/1979 |
| WO | 9802384 A1 | 1/1998 |
| WO | 2005066068 A2 | 7/2005 |
| WO | WO-2017216236 A1 * 12/2017 ............. C01B 39/04 |

OTHER PUBLICATIONS

International Preliminary Report on Patentability for International Application No. PCT/EP2018/0050568, dated Sep. 17, 2019, 9 pages.
International Search Report and Written Opinion for International Application No. PCT/EP2018/050568, dated May 19, 2018, 10 pages.
Liu et al., "Ultrafast Continuous-flow Synthesis of ZSM-5 Zeolite on the Order of Seconds", PNAS, Dec. 13, 2016, vol. 113, No. 50, pp. 14267-14271.
Ju., J., et al., "Continuous synthesis of zeolite NaA in a microchannel reactor," 2006, pp. 115-121, vol. 116, Chemical Engineering Journal.
Shumovskii, A.V., et al., "Continuous process for the production of zeolites in pulsation apparatus," 1995, pp. 253-256, vol. 31, Nos. 5-6, Chemical and Petroleum Engineering.
Liu, Z., et al., "Ultrafast continuous-flow synthesis of crystalline microporous aluminophosphate AlPO$_4$-5," 2014, pp. 1-7, Chemistry of Materials.

* cited by examiner

*Primary Examiner* — David M Brunsman
(74) *Attorney, Agent, or Firm* — RatnerPrestia

(57) ABSTRACT

The present invention relates to a process for preparing zeolite crystals continuously, comprising the continuous introduction of a composition capable of generating zeolite crystals into at least one crystallization reaction zone subjected to stirring means, giving said composition a flow characterized by a relative Reynolds number $Re_r$ of between 40 and 50 000, and the continuous recovery of the crystals formed according to a flow characterized by a net Reynolds number $Re_n$ of between 1 and 1500.

10 Claims, 1 Drawing Sheet

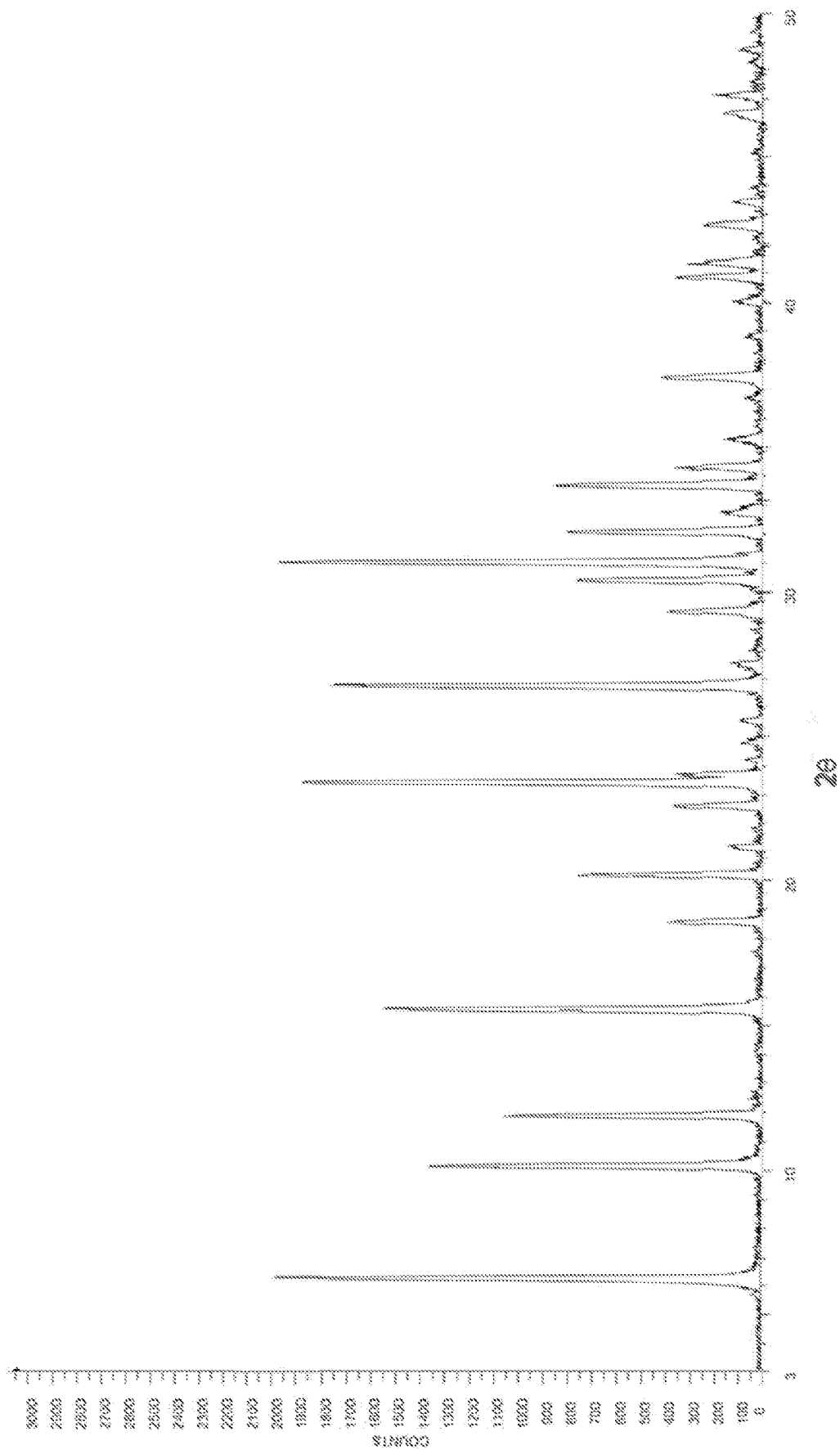

PROCESS FOR CONTINUOUSLY SYNTHESIZING ZEOLITE CRYSTALS

CROSS-REFERENCE TO RELATED APPLICATIONS

This is the national phase of International Application No. PCT/FR2018/050568, filed 12 Mar. 2018, which claims priority to French Application No. 1752196, filed 17 Mar. 2017. The disclosure of each of these applications is incorporated herein by reference in its entirety for all purposes.

FIELD

The present invention relates to the field of zeolites, more precisely the field of the industrial synthesis of zeolite crystals and more particularly that of the continuous industrial synthesis of zeolite crystals.

BACKGROUND

The synthesis of zeolite crystals (or more simply "zeolite synthesis" in the remainder of the present document) is carried out conventionally in industry in a large-sized stirred "batch" reactor, generally with heating of the synthesis gel and/or reaction medium by injection of steam and/or by a heating jacket. The preparation of the synthesis gel consists in mixing a sodium aluminate solution with a sodium silicate solution, it being possible for this mixing to be carried out either in equipment upstream of the crystallization reactor or directly in the crystallization reactor.

In order to improve the conventional crystallization process of zeolites in batch mode, studies have been published on the development of a continuous synthesis process. These studies aim to eliminate or at the very least reduce the drawbacks linked to batch processes and in particular to reduce the size of the equipment needed for the synthesis, to consequently reduce the energy expenditure and to improve the consistency of the quality of the production.

Some studies describe "continuous" processes for synthesizing zeolites, that can be classified under three categories:
1) the synthesis medium is first prepared in a conventional batch reactor then this gel tank continuously supplies a crystallization reactor; in this case, it is referred to as a "semi-continuous" process since a part of the process is carried out in a batch reactor (see for example Jingxi Ju et al., "*Continuous synthesis of zeolite NaA in a microchannel reactor*", Chemical Engineering Journal, 116, (2006), 115-121; Shumovskii et al., "*Continuous process for the production of zeolite in pulsation apparatus*", Chemical and Petroleum Engineering, 31 (5-6), (1995), 253-256; Zhendong Liu et al., "*Ultrafast Continuous-flow synthesis of crystalline microporous AlPO4-5*", Chem. Mater., 2-7, (2014); U.S. Pat. No. 4,848,509 or else U.S. Pat. No. 6,773,694);
2) the synthesis medium is prepared continuously using a shear mixer then is crystallized in a batch reactor in a conventional manner (see for example documents EP 0 149 929 and BE 869156);
3) the synthesis medium is prepared continuously and supplies a reactor continuously in order to carry out the crystallization.

The first two categories are therefore not strictly speaking "continuous" processes since at least a part of the synthesis is carried out in batch mode.

Among the studies of the third category, it emerges that the continuous synthesis conditions are not always describe very precisely, so that it is difficult, if not impossible, to reproduce them. In particular, the precise conditions for carrying out the process do not make it possible to know if and how the risks of fouling of the equipment can be effectively avoided.

Recently, the studies by Zhendong Liu et al., in "*Continuous flow synthesis of ZSM-5 zeolite on the order of seconds*" appeared in PNAS, 113 (50), 13 Dec. 2016, 14267-14271, propose an air vibrator in order to minimize the problems of precipitation and blocking during the preparation of zeolite ZSM-5 (MFI type).

However, the fact remains that the teaching of the prior art regarding continuous zeolite syntheses still poses many problems. Specifically, one of the constraints of the continuous process is for example linked to the crystallization time. Many studies, carried out today on the synthesis of zeolite LTA, show that the crystallization time is several hours at 100° C., or else several seconds only, for the crystallization part of ZSM-5, using pressurized water, at extremely high temperature, cf. Zhendong Liu et al., ibid.

It is therefore known that a watch point in the implementation of a continuous synthesis process containing solids (as is the case in the synthesis of zeolites) is the risk of fouling of the reactors, which are generally and most often tubular reactors, by the accumulation of solids that may involve a drift of the process and high maintenance costs.

Yet, and as disclosed in the prior art, the implementation of a continuous process for synthesizing zeolites, compared to a batch process, should make it possible to make savings in energy expenditure, to construct units that are more compact, therefore with lower investments, and to produce crystals of more uniform quality, in particular owing to an easier control of the manufacturing parameters.

However, it can only be observed that the continuous processes have not been particularly developed to date in the synthesis of zeolites. This is probably due in particular to the risk of fouling (as explained above) owing to the presence of solids in the reaction medium (either amorphous solids present from the start in the synthesis gel, or crystalline solids at the end of the synthesis, after crystallization), and to the difficulties in reconciling crystallization time and quality of the crystals formed. These difficulties risk being amplified if crystal sizes greater than about a hundred nanometres are desired.

Consequently there remains a need for a process for synthesizing zeolites continuously that can eliminate the aforementioned drawbacks.

SUMMARY

Thus, the present invention relates to a continuous process for zeolite synthesis, said process being carried out completely continuously, that is to say in which a gel is prepared continuously then crystallized continuously without a transient batch-mode phase.

Indeed, it has been surprisingly discovered that the application of specific parameters makes it possible to reduce, or even to eliminate any risk of fouling of the system, thus enabling the preparation of zeolites continuously, this being in an industrial manner, that is to say on a large scale, in order to be able to meet the needs of an ever increasing market. Yet other advantages will become apparent in light of the following description of the invention.

Thus, a first subject of the present invention is a process for preparing zeolite crystals continuously, comprising at least the following steps:

a) continuous supply of a composition capable of generating zeolite crystals;
b) continuous introduction of said composition into at least one crystallization reaction zone subjected to stirring means, giving said composition a flow characterized by a relative Reynolds number $Re_r$ of between 40 and 50 000, preferably between 40 and 25 000, more preferably between 70 and 5000, typically between 100 and 2000, limits included,
c) continuous recovery of the crystals formed in step b) according to a flow characterized by a net Reynolds number $Re_n$ of between 1 and 1500, preferably between 1 and 1000, more preferably between 5 and 500, typically between 10 and 200, limits included.

BRIEF DESCRIPTION OF THE FIGURE

FIGURE: Diffractogram of crystals produced in Example 3

DETAILED DESCRIPTION

The net Reynolds number ($Re_n$) is calculated using the following formula:

$$Re_n = m v \cdot V \cdot D / \mu,$$

where my represents the density of the reaction medium (in $kg \cdot m^{-3}$), V represents the velocity of travel of the reaction medium in an empty bed expressed in $m \cdot s^{-1}$, D represents the equivalent diameter of the reactor expressed in metres and $\mu$ represents the viscosity of the reaction medium (in $Pa \cdot s$ or $kg \cdot m^{-1} \cdot s^{-1}$).

The velocity of travel of the reaction medium in an empty bed V is calculated from the measurement of the volume flow rate of the reaction medium and from the cross section of the reactor according to the formula: V=Q/S, where Q represents the volume flow rate of the reaction medium, expressed in $m^3 \cdot s^{-1}$, and S represents the cross section of the empty bed expressed in $m^2$.

The "equivalent diameter" is understood to mean the internal dimension of the reactor measured perpendicularly to the direction of the net flow.

The relative Reynolds number $Re_r$, represents the inertial forces relative to the viscous forces within the reactor, independently of the net flow.

When the stirring is generated by a mechanical stirrer, then the following formula is applied:

$$Re_r = m v \cdot N \cdot d^2 / \mu$$

in which my represents the density of the reaction medium (in $kg \cdot m^{-3}$), N represents the speed of rotation of the stirrer (in $rev \cdot s^{-1}$), d represents the diameter of the stirrer (in m) and $\mu$ represents the viscosity of the reaction medium (in $Pa \cdot s$ or $kg \cdot m^{-1} \cdot s^{-1}$).

When the stirring is generated by an oscillating movement of the reaction medium having an amplitude A (in m) and a frequency f (in $s^{-1}$), then the following formula is applied:

$$Re_r = m v \cdot f \cdot A^2 / \mu$$

in which my represents the density of the reaction medium (in $kg \cdot m^{-3}$), f represents the frequency of the oscillation (in $s^{-1}$), A represents the amplitude of the oscillation (in m) and $\mu$ represents the viscosity of the reaction medium (in $Pa \cdot s$ or $kg \cdot m^{-1} \cdot s^{-1}$).

It is possible to use several stirring systems, by combining for example one or more mechanical stirring systems with one or more oscillating systems. In such cases, it is preferable, or even necessary, for the relative Reynolds number $Re_r$ of each of the stirring systems, taken separately, to be within the range of values defined previously, i.e. between 40 and 50 000, preferably between 40 and 25 000, more preferably between 70 and 5000, and typically between 100 and 2000, limits included.

However, for the process of the present invention, a single type of stirring system, either mechanical or oscillating, is preferred. More preferably, the process of the present invention comprises only a single stirring system, either mechanical or oscillating. According to a preferred embodiment, the process of the invention comprises a single mechanical stirring system. According to another preferred embodiment, the process of the invention comprises a single system of stirring generated by an oscillating movement.

The densities and the viscosities of the reaction medium correspond to the densities and viscosities measured on the composition at the inlet of the reactor.

The formation, and in particular the rapid formation, more specifically the rapid formation with a high degree of purity, of the zeolite crystals is particularly difficult and requires both a sufficient local stirring (turbulence), to promote adequate transfer of material at the solid/liquid crystallization interface enabling an optimal crystallization, and also sufficiently gentle stirring so as not to break the crystals in the course of being formed or disturb the proper organization of the reactive species at the interface.

Although these crystallization conditions are today perfectly well controlled and modulated for preparations in "batch" mode, it proves difficult to combine these two types of stirring in continuous mode without observing phenomena of deposition, clogging, or even plugging of the apparatus, not to mention the quality of the zeolite crystals obtained, especially as the crystallization times, and bulkiness of the synthesis equipment and the apparatus must remain compatible with economical industrial exploitation.

In order to avoid these fouling phenomena, while retaining an excellent quality of zeolite crystals formed, the Applicant has now discovered the optimal stirring conditions during the continuous preparation of zeolite crystals, which conditions are characterized by the type of flow to be applied to the fluid globally (net Reynolds number, correlated to the net velocity, therefore to the residence time for a given type of reactor) and locally (relative Reynolds number).

Thus, and according to a preferred embodiment of the present invention, the difference between the relative Reynolds number $Re_r$ and the net Reynolds number $Re_n$ (i.e. the difference $Re_r - Re_n$) is strictly greater than 50, preferably strictly greater than 100, more preferably strictly greater than 150, and very preferably strictly greater than 180.

Thus, the process of the present invention makes it possible to provide an industrial process that benefits from the advantages of continuous synthesis compared to standard "batch mode" syntheses, such as better control of the temperature, compactness of the equipment, uniformity of production, but also and above all which has the advantage of limiting the fouling of the equipment.

The composition capable of generating zeolite crystals may be any type of composition well known to a person skilled in the art depending on the type of zeolite to be prepared and typically comprises at least one source of silica and at least one source of alumina, and/or any other source of element(s) that may constitute a zeolite framework, for example a source of phosphorus, of titanium, of zirconium, etc. At least one aqueous solution of an alkali or alkaline-earth metal hydroxide, preferably of an alkali metal hydroxide, typically of sodium hydroxide and/or also organic structure-directing agents or templates may optionally, but preferably, be added to this composition.

A source of silica is understood to mean any source well known to a person skilled in the art and in particular a solution, preferably an aqueous solution, of silicate, in particular of alkali or alkaline-earth metal silicate, for example of sodium silicate, or of colloidal silica.

A source of alumina is understood to mean any source of alumina well known to a person skilled in the art and in particular a solution, preferably an aqueous solution, of aluminate, in particular of alkali or alkaline-earth metal aluminate, for example of sodium aluminate.

The concentrations of the various solutions of silica and alumina are adapted depending on the nature of the source of silica, of the source of alumina, the respective proportions of the sources of alumina and of silica to which the alkali or alkaline-earth metal hydroxide solution and/or one or more organic structure-directing agents are added, according to the knowledge of a person skilled in the art. Information will in particular be found on the chemical nature of the organic structure-directing agents to optionally be used as a function of the zeolite to be synthesized on the website of the International Zeolite Association (www.iza-online.org), for example and non-limitingly tetramethylammonium (TMA), tetra-n-propylammonium (TPA), methyltriethylammonium (MTEA).

The respective proportions and concentrations of the various silica and alumina solutions are known to a person skilled in the art or may be easily adapted by a person skilled in the art depending on the nature of the zeolite that it is desired to prepare, from data in the literature.

According to a preferred embodiment, the process of the present invention enables the preparation of any type of zeolite known to a person skilled in the art and, for example and non-limitingly, any zeolite of MFI type, and in particular silicalite, any zeolite of MOR type, of OFF type, of MAZ type, of CHA type and of HEU type, any zeolite of FAU type, and in particular zeolite Y, zeolite X, zeolite MSX, zeolite LSX, any zeolite of EMT type or else any zeolite of LTA type, i.e. zeolite A, and also the other zeotypes, such as for example titanosilicalites.

The term "zeolite MSX" (medium silica X) means a zeolite of FAU type with an Si/Al atomic ratio of between about 1.05 and about 1.15, limits included. The term "zeolite LSX" (low silica X) means a zeolite of FAU type with an Si/Al atomic ratio equal to about 1.

The process according to the invention is particularly suitable for the preparation of zeolites chosen from zeolites of MFI type, and in particular silicalite, of FAU type, and in particular zeolite Y, zeolite X, zeolite MSX, zeolite LSX and of LTA type, i.e. zeolite A, and also the zeolites of CHA type and the zeolites of HEU type.

The process according to invention is moreover very particularly suitable for the preparation of any zeolite of FAU type, and in particular zeolite X, zeolite MSX, zeolite LSX. The zeolites of MFI type, and in particular silicalite, may also be very advantageously prepared according to the process of the invention.

Moreover, the continuous preparation process of the present invention is not limited to the preparation of the zeolites described above, but also includes the corresponding zeolites with hierarchical porosity. The zeolites with hierarchical porosity are solids comprising a microporous network linked to a network of mesopores, and thus make it possible to reconcile the properties of accessibility to the active sites of the mesoporous zeolites known from the prior art and those of maximum crystallinity and maximum microporosity of "conventional" zeolites (without mesoporosity). In this case, specific structure-directing agents are introduced into the synthesis medium, for example structure-directing agents of organosilane type as described in document FR 1 357 762.

More specifically, the present invention describes a process for preparing zeolite crystals comprising at least the following steps:

1) continuous preparation of a composition capable of generating zeolite crystals, in order to obtain a synthesis medium, 2) addition of seed to the synthesis medium obtained in step 1), 3) continuous operation, under stirring, of the reaction for forming zeolite crystals, according to steps a), b) and c) defined above, 4) filtration of the reaction medium in order to recover the crystals produced, and 5) optionally recycling of the mother liquors.

The process of the invention is particularly energy-efficient. Furthermore, the process may be carried out with equipment that is compact and in particular much less bulky than the equipment known to a person skilled in the art for the preparation of zeolites in batch mode.

The synthesis medium from step 1) is prepared as described above by mixing sources of silica and alumina in a basic medium. This mixing is advantageously carried out in a rotor-stator shear mixer, that is to say a shear mixer comprising a rotor that rotates at high speed and that makes the mixture pass through a stator, the geometry of which may vary.

The degree of shear is defined by the shear rate $\gamma$ in $s^{-1}$ which is equal to the tip speed of the rotor divided by the thickness of the gap between the rotor and the stator. The tip speed $V_p$ is calculated from the speed of rotation $V_r$ and from the diameter of the rotor d according to the equation: $V_p = V_r \pi d_r$ (expressed in $m \cdot s^{-1}$), where $V_r$ is the speed of rotation expressed in $rev \cdot s^{-1}$, $d_r$ is the diameter of the rotor (expressed in m) and $\gamma$ is equal to $V_p/e$, where e represents the distance of the gap between the rotor and the stator (expressed in m).

The shear rate generally applied is between 10 000 $s^{-1}$ and 200 000 $s^{-1}$, preferably between 10 000 $s^{-1}$ and 100 000 $s^{-1}$.

The addition of seed into the synthesis medium makes it possible to obtain crystallization times that are short enough to be compatible with the constraints of a continuous process. This addition of seed may be carried out by any means known to a person skilled in the art for example using a static mixer which has the advantage of promoting the homogenization of the synthesis medium/seed mixture. The term "seed" (also referred to as "seeding agent") is understood to mean a solid or liquid that promotes the orientation of the synthesis towards the desired zeolite.

The formation of the zeolite crystals (crystallization) is carried out, as indicated above, with stirring and under flow conditions characterized by a relative Reynolds number $Re_r$ of between 40 and 50 000, preferably between 40 and 25 000, more preferably between 70 and 5000, typically between 100 and 2000, limits included. Moreover, this crystallization step is advantageously carried out at high temperature, typically at a temperature between 60° C. and 200° C., preferably between 80° C. and 160° C.

In one very particularly preferred embodiment, the step of forming zeolite crystals (crystallization, step c) described above) is carried out in a tubular reactor and may be carried out under pressure, for example under autogenous pressure, under atmospheric pressure, or more generally under any pressure, typically between atmospheric pressure and 1.5 MPa.

After the crystallization step, the crystals obtained are stripped of the mother liquors, for example by filtration, centrifugation, and other techniques well known to a person skilled in the art.

It is possible, and this represents a preferred embodiment of the present invention, to make provision for a recycling of all or some of the mother liquors, that is to say of the synthesis waters collected after elimination, for example by filtration, of the solid obtained, at the outlet of the continuous reactor. Before being recycled, the mother liquors may optionally have undergone one or more treatments chosen from ultrafiltration, reconcentration or distillation.

The recycling of the mother liquors has many advantages, and in particular makes it possible to save on raw material and to recover heat. Thus, the recycling of the mother liquors makes it possible, inter alia, to reduce the overall energy consumption of the synthesis process, the amount of basic solution (for example sodium hydroxide) used, etc.

The crystals obtained at the end of step 4) are optionally subjected to one or more treatments well known to a person skilled in the art, such as washing, cation exchange, drying, impregnation, activation, etc., it being possible for this or these treatment(s) to be carried out in batch mode or continuously, advantageously continuously.

The washing is typically washing with water in order to enable the elimination of the residual mother liquors that might still be present.

The drying may be carried out at any temperature and typically at a temperature between 40° C. and 150° C., for a duration that may vary between several minutes and several hours, typically between several minutes and 10 hours. The drying operation at a temperature below 40° C. could prove to be much longer and thus economically unprofitable, whereas a drying temperature above 150° C. could result in a greater or lesser deterioration of the still wet zeolite crystals.

The activation of the zeolite crystals, which are preferably dried beforehand, is conventionally carried out at a temperature between 150° C. and 800° C., for a duration varying from several minutes to several hours, and typically from several minutes to 10 hours.

This synthesis device that makes it possible to carry out the process of the present invention may comprise, in an improved embodiment, any appropriate means for improving the heat transfer, the transport of material, etc., within the reaction mixture in all or part of the process, for example by additions of source(s) of ultrasonic waves and/or microwaves, to name but a few means among those well known to a person skilled in the art.

In a particularly advantageous embodiment, the process of the invention comprises the addition, in one or more stages, before, after or during the crystallization step, of one or more seeding agents. This addition of seeding agent(s) makes it possible in particular to substantially accelerate the crystallization step.

A seeding agent (or seed) is understood to mean a solution or a suspension, in liquid form or in the form of a gel, a solid or a liquid that promotes the orientation of the synthesis towards the desired zeolite. The seeding agents are well known to a person skilled in the art and are for example chosen from nucleating gels, zeolite crystals, mineral particles of any nature, etc., and also mixtures thereof.

According to a preferred aspect, the seeding agent is a nucleating gel, and, more preferably, said nucleating gel comprises a homogeneous mixture of a source of silica (for example sodium silicate), a source of alumina (for example alumina trihydrate), optionally but advantageously a strong mineral base, for instance sodium hydroxide, potassium hydroxide or calcium hydroxide to mention but the main ones and the ones most commonly used, and water. One or more structure-directing agents, typically organic structure-directing agents, may also optionally be introduced into the nucleating gel.

As indicated above, the synthesis process according to present invention comprises a continuous crystallization step that is carried out in at least one crystallization reaction zone subjected to stirring means, giving said composition a flow characterized by a relative Reynolds number ($Re_r$) as defined above.

The stirring means may be of any type well known to a person skilled in the art, and for example and non-limitingly, when the reactor is a tubular reactor suitable for being operated continuously, this tubular reactor may be provided with restrictions (such as rings, deflectors, etc.), may be equipped with a stirring system, with an oscillating or pulsating system (enabling a back-and-forth movement of the reaction medium to be generated by means for example of a piston, membrane), etc., and also two or more of these techniques combined.

In a preferred embodiment of the invention, the process is carried out in a tubular reactor, optionally but preferably provided with restrictions and equipped with a system that enables pulses to be imparted to the fluid circulating in the reactor, as for example described in application US 2009/0304890 by NiTech. Other systems that make it possible to obtain at least one reaction zone in which the flow is characterized by a relative Reynolds number ($Re_r$) as defined above may also be suitable for the process of the present invention.

Thus, and according to a very particularly suitable embodiment, the synthesis process according to the present invention is a continuous process carried out in a tubular reactor provided with internal systems of restrictions and with a pulsating device, and operated under particular conditions, namely:
an oscillation amplitude of the pulsating device of between 20 mm and 400 mm, preferably between 25 mm and 300 mm, more preferably between 30 mm and 200 mm, and
an oscillation frequency of between 0.1 Hz and 2 Hz, preferably between 0.15 Hz and 1.5 Hz, more preferably between 0.4 Hz and 1 Hz.

The oscillation amplitude may nevertheless vary to a large extent, and preferably, the amplitude is between 0.5D and 3D, preferably between D and 2D, where D is the equivalent diameter of the reactor, as defined above. Similarly, and in the presence of restrictions within the tubular reactor, said restrictions are preferably spaced apart by a distance that varies between 0.5D and 3D, preferably between D and 2D.

Indeed, it has been observed that, in order to prevent fouling or at the very least to prevent excessively fast fouling of the reactor, it is important, or even necessary, to generate local turbulences within the reactor, via oscillation movements applied to the synthesis medium, oscillations having an amplitude that should be greater than 20 mm, and preferably between 20 mm and 400 mm, as indicated above.

Moreover, this pulsating system, or else oscillating system, may advantageously be coupled to restrictions positioned in all or part of the reactor. According to one embodiment, these restrictions are present all along the tubular reactor in the form of rings, deflectors, etc.

The coupling of these restrictions with the appropriate oscillations (the amplitude and frequency of which may vary), applied to the reaction medium in the tubular reactor, makes it possible to generate a flow characterized by a relative Reynolds number $Re_r$ within the range of values defined above.

The oscillations imposed on the reaction medium, advantageously accompanied by the presence of the restrictions in the reactor, make it possible to generate optimal stirring, both axial and radial. This stirring is not only necessary for an optimal formation of the zeolite crystals, but also makes it possible to intensify the exchanges of material within the reaction medium. As another advantage, this stirring also improves the efficiency of the heat exchanges.

It has thus been observed that the oscillation amplitude must be sufficient to enable the solids present in the tubular reactor to progress through the tube in a regular manner, while clearing the restrictions. Too low an amplitude may lead to fouling, whereas too high an amplitude may be detrimental to the quality of the crystallization. It emerges that the oscillation frequency must be maintained in the appropriate range defined above, so as not to incur the effects described above (fouling or poor crystallization quality). The amplitude is preferably at least equal to the distance between two restrictions. Thus, the reactor in its entirety may thus be considered to be a cascade of perfectly stirred reactors, a reactor being embodied by the space between two restrictions.

Another advantage linked to the process of the present invention is that the modification of the oscillation frequency makes it possible to vary the size of the crystals obtained. Specifically, it is possible to reduce the size of the crystals by increasing the frequency of the oscillator and conversely to increase the size the crystals by decreasing the frequency of the oscillator.

The process according to the present invention generally enables the synthesis of zeolite crystals having a particle size (number-average diameter determined by counting on SEM images) that may range from 0.1 µm to 20 µm, and preferably that may range from 0.2 µm to 10 µm, and more preferably from 0.3 µm to 8 µm, very preferably from 0.3 µm to 5 µm. The process of the present invention makes it possible in particular to synthesize zeolite crystals having a purity equal to or greater than 98%, and preferably between 98% and 100%.

Within the reactor comprising at least one stirred zone where the crystals are formed continuously, the starting gel and the crystals formed are subjected to a flow in order to make the starting gel progress along the reactor and thus enable the expulsion of the crystals formed at the reactor outlet. As indicated above, the crystals formed continuously are recovered at the outlet of the reactor according to a flow characterized by the net Reynolds number ($Re_n$) defined above, and which corresponds to a flow that may be considered to be laminar flow.

Thus, to achieve the desired net Reynolds number ($Re_n$), various parameters may be adapted, such as the equivalent diameter of the tubular reactor, and the net flow velocity. Too high a net Reynolds number is likely to disrupt the crystallization, for example by preventing the crystallization or by creating crystalline phases other than the phase desired. Too low a net Reynolds number may lead to a risk of fouling of the reactor in continuous mode.

The monitoring of the flow rate of raw material at the inlet of the reactor and/or of the production of crystals at the outlet of the reactor may be obtained according to any means known to a person skilled in the art and for example by means of pumps, optionally combined with flow regulators.

It has thus been shown for example that it is possible to operate without fouling when use is made of a tubular reactor provided with an oscillation system that makes it possible to achieve the relative Reynolds number as defined above, and a system of pumps that makes it possible to achieve a net Reynolds number as defined above.

A residence time of 90 minutes makes it possible to obtain zeolite crystals having a purity of greater than 95%, or even greater than 98% in a reactor having a length typically between 1 m and 100 m and a diameter typically between 0.5 cm and 30 cm. The crystallinity is determined by x-ray diffraction (XRD).

By operating with a reactor as defined in patent application US 2009/0304890 by NiTech and under the operating conditions of the process of the present invention, it was not possible to observe any fouling after 24 hours of continuous operation for the preparation of X-type zeolite.

Moreover, it was possible to reduce the size of the crystals by accelerating the frequency of the oscillator.

EXAMPLES

The following examples make it possible to illustrate the present invention without actually imparting any limiting nature to the scope of the desired protection which is defined by means of the appended claims.

CHARACTERIZATION TECHNIQUES

Qualitative and Quantitative Analysis by X-Ray Diffraction (XRD)

The purity of the zeolite crystals synthesized is evaluated by x-ray diffraction analysis, known to a person skilled in the art under the acronym XRD. This identification is carried out on a Bruker XRD apparatus.

This analysis makes it possible to identify the various zeolites present in the adsorbent material since each of the zeolites has a unique diffractogram defined by the positioning of the diffraction peaks and by their relative intensities.

The zeolite crystals are ground and then spread and levelled out on a sample holder by simple mechanical compression.

The conditions under which the diffractogram is acquired on the Bruker D5000 machine are as follows:
Cu tube used at 40 kV—30 mA;
slit size (divergent, scattering and analysis slits)=0.6 mm;
filter: Ni;
sample device rotating at: 15 rpm;
measuring range: $3°<2\theta<50°$;
increment: $0.02°$;
counting time per increment: 2 seconds.

Interpretation of the diffractogram obtained is performed with the EVA software with identification of the zeolites using the ICDD PDF-2 release 2011 base.

The amount of crystals, by weight, is determined by XRD analysis; this method is also used to measure the amount of noncrystalline phases. This analysis is performed on a Bruker machine, and the amount by weight of the zeolite crystals is then evaluated using the TOPAS software from the company Bruker. The purity is expressed as a weight percentage of desired crystalline phase relative to the total weight of the sample.

Example 1 (According to the Invention): Continuous Synthesis of Zeolite A

The continuous synthesis of zeolite A consists in supplying a tubular reactor (internal diameter=1.5 cm and length 20 m) with a synthesis medium defined below added to which is 1% by weight of nucleating gel clarified below.

The nucleating gel is prepared by adding a solution of sodium silicate at 35° C. to a solution of sodium aluminate at 35° C. so as to obtain a gel with the composition: 2.66 $Na_2O/Al_2O_3/1.92\ SiO_2/65\ H_2O$.

The solution of sodium aluminate is prepared by dissolving alumina in a solution of sodium hydroxide at boiling point then cooling to 35° C. This solution contains 938.7 g of alumina, 1539.0 g of an aqueous solution of sodium hydroxide at 50% by weight and 1542.6 g of water.

The solution of sodium silicate is prepared by mixing 2601 g of sodium silicate with 486 g of an aqueous solution of sodium hydroxide at 50% by weight and 2160 g of water, then heating to 35° C.

The nucleating gel is kept at 35° C. for 2 hours and then cooled to 25° C. and stored for 20 hours at 25° C. This solution may then be used as seed in the synthesis of zeolite A by continuously adding it to the synthesis medium with a content equal to 1% by weight relative to the weight of the synthesis medium.

The synthesis medium is prepared using a rotor-stator shear mixer, of which the diameter of the rotor is 38.1 mm and the distance of the gap between the rotor and the stator is 0.2 mm. A solution of sodium aluminate at 35° C. and a solution of sodium silicate at 35° C. are mixed simultaneously so as to obtain a gel with the composition: 3.5 $Na_2O/Al_2O_3/2.0\ SiO_2/175\ H_2O$.

The solution of sodium aluminate is prepared by dissolving alumina in a solution of sodium hydroxide at boiling point then cooling to 35° C. This solution contains 31 824 g of alumina, 86 402 g of an aqueous solution of sodium hydroxide at 50% by weight and 273 600 g of water.

The solution of sodium silicate is prepared by mixing 91 152 g of sodium silicate with 8641 g of an aqueous solution of sodium hydroxide at 50% by weight and 254 880 g of water, then heating to 35° C.

In order to prepare the synthesis medium, the chamber of the Silverson shear in-line mixer is simultaneously supplied using two peristaltic pumps: the flow rate of the aluminate solution is equal to 220.5 $g \cdot min^{-1}$ and that of the silicate solution is equal to 211.5 $g \cdot min^{-1}$. The supply lines are first filled with water.

The mixing is carried out with a rotor speed of 550 $rev \cdot min^{-1}$, which corresponds to a shear rate of 54 800 $s^{-1}$. The synthesis medium continuously supplies the static mixer into which the nucleating gel is introduced at 25° C. with a flow rate of 4.32 $g \cdot min^{-1}$ (1% by weight of the synthesis medium).

The stream that leaves the static mixer consisting of the mixture of the synthesis medium and the nucleating gel has a density of 1200 $kg \cdot m^{-3}$ and a viscosity of 5 mPa·s. A weight fraction of ⅕ of this stream directly supplies the pulsed tubular reactor.

The pulsed tubular reactor is initially heated by operating the oscillator (amplitude 50 mm and frequency 0.4 Hz). Water is firstly circulated while adjusting the temperature of the oil bath to 108° C. so as to obtain a temperature on the inside of 100° C. The pilot plant is then supplied with the mixture of the synthesis medium and the nucleating gel produced using a 17-element static mixer made of 316 stainless steel having a length of 125 mm sold by Fisher Scientific (reference 1174-4119) while maintaining an oscillation having an amplitude of 50 mm and a frequency of 0.4 Hz. With these operating conditions, the net Reynolds number ($Re_n$) is equal to 13.7 and the relative Reynolds number ($Re_r$) is equal to 240.

After 24 hours of continuous operation, no pressure increase is observed in the equipment, as indicated on the pressure manometer installed at the inlet of the tubular reactor. The feed flow rate of 2.4 $L \cdot h^{-1}$ makes it possible to obtain a residence time in the tubular reactor of 90 minutes, a sufficient residence time to obtain a crystallized zeolite LTA. The reaction medium withdrawn at the outlet of the tube is filtered and washed with water until a neutral pH is obtained, then dried at 80° C. and activated at 550° C.

In order to empty the equipment, cold water is circulated with a flow rate of 60 $L \cdot h^{-1}$ for 1 hour. The crystals of zeolite LTA obtained have a crystallinity of 99%.

Example 2 (Comparative): Continuous Synthesis of Zeolite A

When the continuous synthesis is carried out according to the operating conditions of example 1, but by reducing the amplitude of the oscillator to 20 mm, then, as indicated on the pressure manometer installed at the inlet of the tubular reactor, pressure increases are observed after only 2 hours of operation, which result in a plugging of the equipment after 3 hours and 15 minutes of synthesis. With these operating conditions, the net Reynolds number is equal to 13.7 and the relative Reynolds number is equal to 38.

Example 3 (According to the Invention): Continuous Synthesis of Zeolite X

By reproducing the operating conditions of example 1, and by modifying the nature of the composition of the starting reaction medium, a synthesis of zeolite of faujasite X type is carried out continuously for 24 hours. The crystals of zeolite X obtained at the outlet of the tubular reactor have a crystallinity of 99%. The diffractogram of these crystals is presented in the FIGURE.

The invention claimed is:

1. Process for preparing zeolite crystals continuously, comprising at least the following steps:
   a) continuous supply of a composition capable of generating zeolite crystals;
   b) continuous introduction of said composition into at least one crystallization reaction zone subjected to stirring means, giving said composition a flow characterized by a relative Reynolds number $Re_r$ of between 40 and 50 000, limits included,
   c) continuous recovery of the crystals formed in step b) according to a flow characterized by a net Reynolds number $Re_n$ of between 1 and 1500, limits included.

2. Process according to claim 1, wherein the difference between the relative Reynolds number $Re_r$ and the net Reynolds number $Re_n$ is greater than 50.

3. Process according to claim 1, for preparing crystals of a zeolite of MFI type, a zeolite of MOR type, of OFF type, of MAZ type, of CHA type and of HEU type, a zeolite of FAU type, a zeolite of EMT type or a zeolite of LTA type.

4. Process according to claim 3, for preparing zeolite crystals, where the zeolite is chosen from zeolites of MFI type, of FAU type, of LTA type, the zeolites of CHA type and the zeolites of HEU type.

5. Process according to claim 1, comprising at least the following steps:

1) continuous preparation of a composition capable of generating zeolite crystals, in order to obtain a synthesis medium,
2) addition of seed to the synthesis medium obtained in step 1),
3) continuous operation, under stirring, of the reaction for forming zeolite crystals, according to steps a), b) and c) according to claim 1,
4) continuous filtration in order to separate the crystals obtained from the mother liquors, and
5) optionally recycling of the mother liquors.

6. Process according to claim 1, wherein the crystallization step is carried out at a temperature of between 60° C. and 200° C.

7. Process according to claim 1, further comprising the addition, in one or more stages, before, after or during the crystallization step, of one or more seeding agents.

8. Process according to claim 7, wherein the seeding agent is chosen from a nucleating gel, a crystal, a mineral particle and mixtures thereof.

9. Process according to claim 1, which process is carried out in a tubular reactor.

10. Process according to claim 1, carried out in a tubular reactor provided with internal systems of restrictions and with a pulsating device, and operated under particular conditions, namely:
   an oscillation amplitude of the pulsating device of between 20 mm and 400 mm, and
   an oscillation frequency of between 0.1 Hz and 2 Hz.

* * * * *